United States Patent [19]

Toyoshima

[11] Patent Number: 5,229,850
[45] Date of Patent: Jul. 20, 1993

[54] VIDEO MONITORING SYSTEM INCLUDING A MEMORY FOR STORING AND TRANSMITTING A VIDEO SIGNAL IMMEDIATELY FOLLOWING THE OCCURRENCE OF AN EVENT

[75] Inventor: Keiichi Toyoshima, Tokyo, Japan

[73] Assignee: Kabushiki Kaisha Toshiba, Kawasaki, Japan

[21] Appl. No.: 737,138

[22] Filed: Jul. 29, 1991

[30] Foreign Application Priority Data

Jul. 30, 1990 [JP] Japan ................................ 2-199257

[51] Int. Cl.$^5$ ........................ H04N 7/18; H04N 7/10
[52] U.S. Cl. ....................................... 358/108; 358/86
[58] Field of Search ................... 358/85, 86, 108, 125

[56] References Cited

U.S. PATENT DOCUMENTS

| | | | |
|---|---|---|---|
| 4,651,143 | 3/1987 | Yamanaka | 358/108 |
| 4,825,457 | 4/1989 | Lebowitz | 358/108 |
| 4,831,438 | 5/1989 | Bellman et al. | 358/108 |
| 4,943,854 | 7/1990 | Shiota et al. | 358/108 |
| 4,959,713 | 9/1990 | Morotomi et al. | 358/108 |
| 5,027,104 | 6/1991 | Reid | 358/108 |
| 5,061,997 | 10/1991 | Rea et al. | 358/108 |

OTHER PUBLICATIONS

Toshiba IX-5010 ISDN Remote Supervisory Equipment sales pamphlet.

Primary Examiner—John K. Peng
Attorney, Agent, or Firm—Finnegan, Henderson, Farabow, Garrett & Dunner

[57] ABSTRACT

A communication path is established, only when monitoring a video signal on an object is required, between a sending station which acquires the video signal and a receiving station which monitors the acquired video signal through a display or the like. Usually, the video signal is monitored delayed by a time taken for establishment of the path. In the video monitoring system, a sensor senses the occurrence of a particular event to be monitored, the video of the object existing at the occurrence of the particular event is stored in an image memory on the basis of the output of the sensor indicative of such sensing. After the establishment of the communication path between the transmission and receiving stations, the stored video is transmitted to the receiving station to thereby ensure monitoring a truly required video.

16 Claims, 9 Drawing Sheets

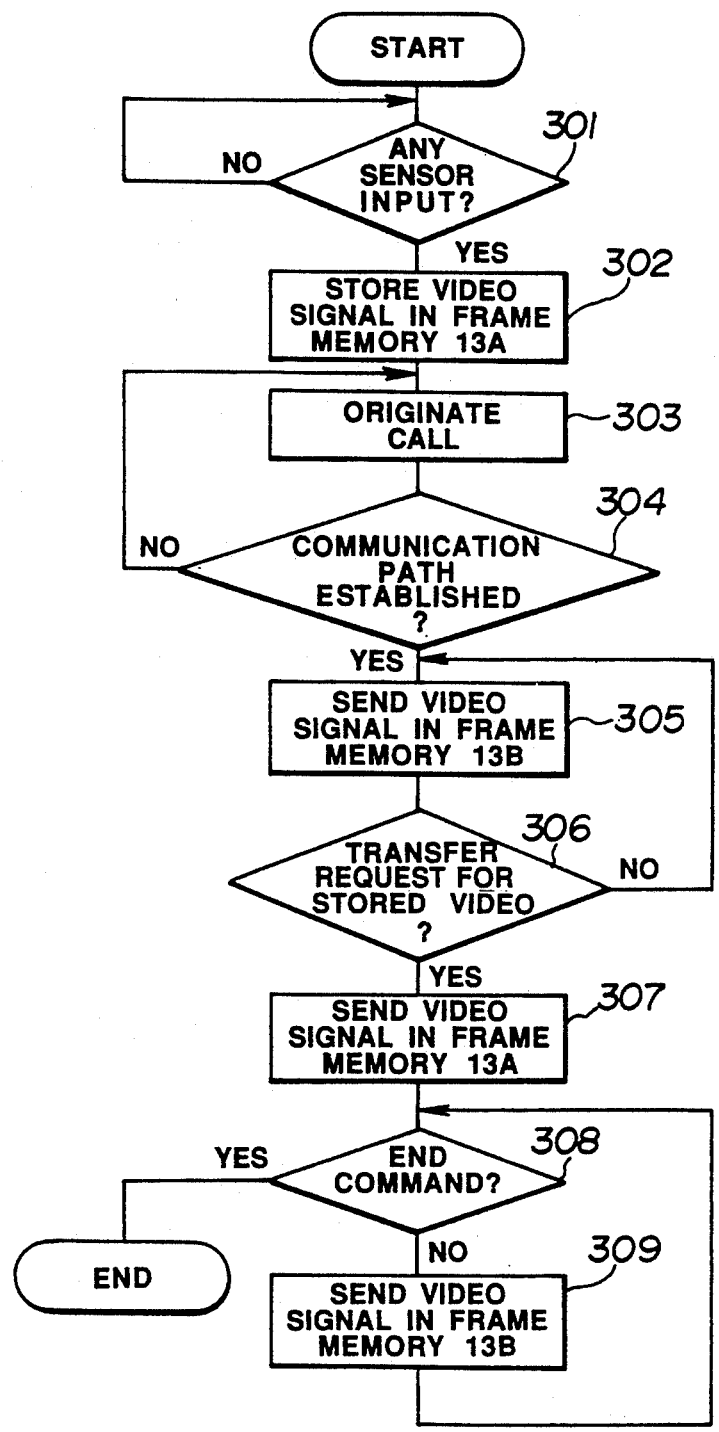

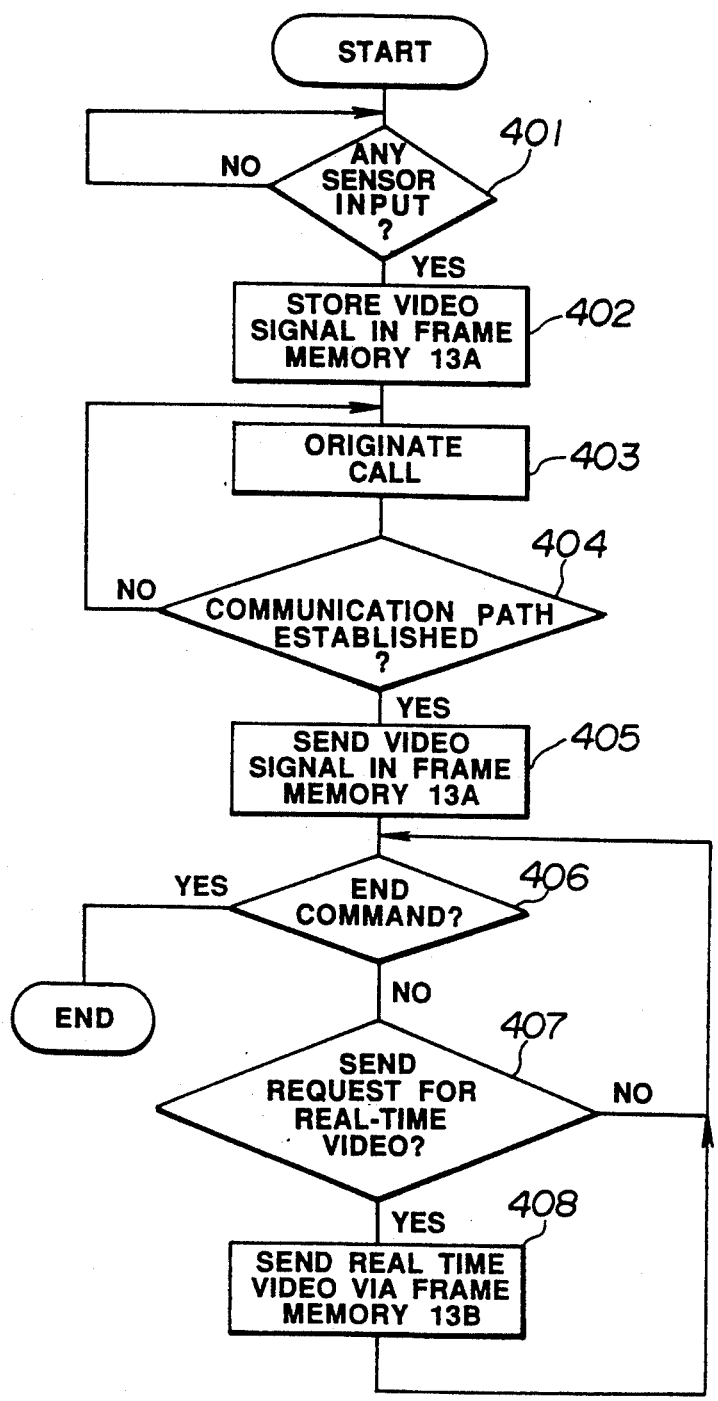

VIDEO MONITORING SYSTEM INCLUDING A MEMORY FOR STORING AND TRANSMITTING A VIDEO SIGNAL IMMEDIATELY FOLLOWING THE OCCURRENCE OF AN EVENT

BACKGROUND OF THE INVENTION

1. Field of the Invention

This invention relates to video monitoring systems applied to systems such as security systems, industrial television (ITV) systems, etc., and more particularly to a video monitoring system applied to an environment where a communication path between a sending station which acquires the video signal and a receiving station which receives and monitors the video signal by means of a display or the like is established only when monitoring the video signal is required.

2. Description of the Related Art

A conventional video monitoring system has a dedicated transmission path fixedly provided between the sending station and the receiving station.

However, according to the conventional video monitoring system, the transmission path is always established even in an ordinary state where monitoring is not required.

At present, a video monitoring system has been considered in which there is provided a switching networks for selectively connecting the sending station and the receiving station only when monitoring the video is required.

However, in such system the establishment of a communication path (telephonic communication path) through the switching network takes considerably long time. Therefore, although the establishment of the communication path is started immediately after the occurrence of a particular event to be monitored such as an abnormality is detected, it is impossible to monitor the most important video images during the initial period of occurrence of the event. In other words, monitoring of the video images becomes possible after the communication path has been established, and therefore monitoring is not from the occurrence of the event, but from the establishment of the communication path.

In case that the video monitoring system is used in a security system, only video images generated some time after invasion of a robber can be monitored by the receiving station. In case that the video monitoring system is used in an ITV system, only video images generated some time after the occurrence of abnormality can be monitored. Accordingly, such monitoring systems cannot provide important video images to be monitored.

SUMMARY OF THE INVENTION

The present invention is made in view of the above-described situations, and therefore, it is an object of the present invention to provide a video monitoring system capable of establishing a communication path between the sending station which acquires the video signal and the receiving station which monitors the acquired video signal through a display only when monitoring is desired and capable of reliably monitoring video images immediately after the occurrence of a particular event to be monitored.

In order to achieve the above object, the sending station comprises a memory for storing a video signal on an object corresponding to a particular event to be monitored, a sensor for detecting the occurrence of a particular event to be monitored, and a control unit for storing in the memory the video signal outputted from an image pickup device in accordance with the detection of the occurrence of the particular event by the sensor, whereby after a communication path is established between the sending station and the receiving station, the stored video signal is read from the memory and transmitted to the receiving station.

The video signal stored in the memory is transmitted to the receiving station at any time. The video signal may directly be transmitted to the receiving station after the establishment of the communication path or in accordance with a request for transmission of such video signal from the receiving station.

Thus, the video signals generated immediately after the sensor detects the occurrence of a particular event, which are usually most important in the security system or ITV system, can be stored in the memory. Accordingly, even though a considerable time is dissipated for the establishment of the communication path, the video signals stored in the memory can be monitored after the establishment of the communication path. Video signals picked up after the establishment of the communication path can, of course, be monitored on a real time basis.

The memory may be a frame memory whose capacity is large enough to store at least one field of video signals outputted from the pickup device. The video signals stored in the frame memory can be monitored with a minimum resolution.

The use of memory means having a large capacity permits acquisition of video images of a plurality of screens lasting several seconds to several minutes. When the control unit places the memory in a write-enabled state and stores in the memory image signals corresponding in quality to the storage capacity of the memory when the sensor detects the occurrence of a particular event, the time dissipated for the establishment of the communication path is compensated for by a time corresponding to the storage capacity of the memory means (in more accurately, the time additionally including the pickup speed of the pickup device and the speed at which the video signal is written into the memory) to thereby maintain important videos generated during that time.

Of course, any process may be adopted for controlling the memory to store the video signals in the memory. For example, the memory may always be in a state where video signals outputted from the pickup device can be written. When the sensor detects the occurrence of the particular event, the memory may be disabled any more to store so as to reserve the video signals already stored.

In case that an ISDN network is used as the switching network which connects the sending station and the receiving station, the communication path is constituted by a control signal path which delivers and receives a control signal for logical connection between the sending and receiving stations and a video signal path to transmit the video signal from the sending station to the receiving station when the sending and receiving stations are logically connected. If the video signal path is a single path, the video signal stored in the memory and the video signal outputted from the pickup device on a real time basis are transmitted from the sending station to the receiving station using the video signal path on a time or frequency division manner. If the video signal path includes the two separate paths, the video signal stored in the memory and the video signal outputted from the pickup device on a real time basis are transmitted through the corresponding video signal paths to the receiving station.

In any of the above cases, if a copy memory which copies and stores the video signal read from the memory and transmitted through the video signal path is provided in the receiving station and the video signal copied and stored in the copying memory is delivered to the monitor at any required time, the video signal stored in the memory and the video signal outputted from the pickup device on a real time can rapidly be switched and reproduced in the receiving station.

If there is a plurality of such sending stations and video signals acquired by the respective sending stations are monitored together by a single receiving station, the video monitoring system according to the present invention is also advantageous.

BRIEF DESCRIPTION OF THE DRAWINGS

FIG. 3 is a flowchart indicative of the illustrative operation of the system of the FIG. 1 embodiment.

FIG. 4 is a flowchart indicative of a further illustrative operation of the system.

DESCRIPTION OF THE PREFERRED EMBODIMENTS

Figure 1:
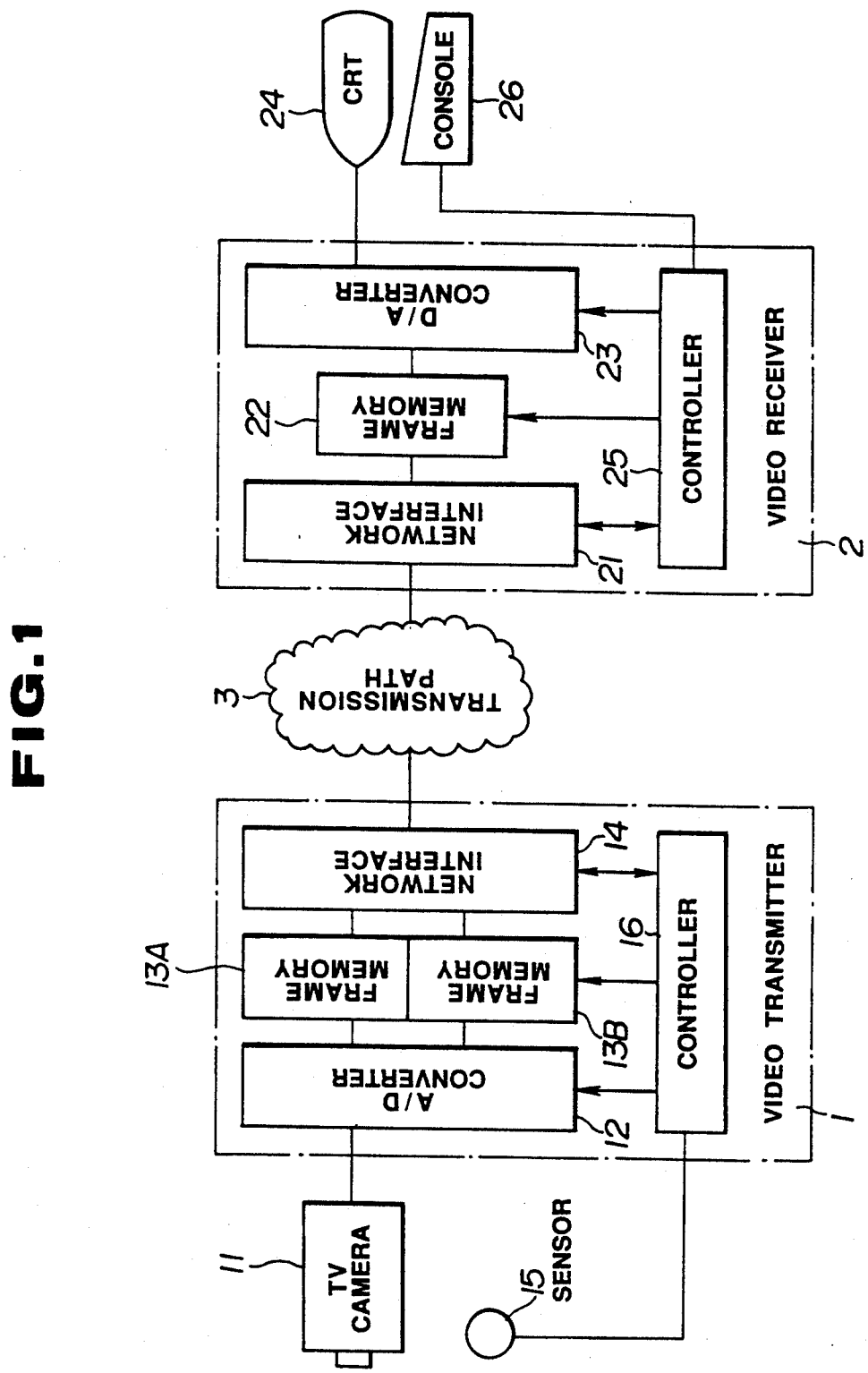
FIG. 1 is a block diagram of the system structure of a first embodiment of a video monitoring system according to the present invention.

FIG. 1 shows a first embodiment of a video monitoring system according to the present invention.

As shown in FIG. 1, the system basically includes a video transmitter 1 as a sending station, a video receiver 2 as a receiving station, and a transmission path 3 which logically connects the transmitter and receiver such that they can transmit and receive various signals using, for example, an ISDN network.

The video transmitter 1 is connected to a television camera 11 which acts as a pickup device which at all times picks up an object to be monitored, and a sensor 15 which senses the occurrence of a particular event such as abnormality to be monitored.

When the video monitoring system is used, for example, as the ITV system, the sensor 15 is a level sensor, a temperature sensor or a video sensor called a motion detector which detects the specified move and state of the object. If the video monitoring system is used as the security system, a door sensor or an infrared sensor is used which is known as sensing the presence of an invader by sensing the temperature of his body or as sensing the presence of an invader due to interruption of infrared rays.

The video transmitter 1 includes an A/D (analog-to-digital) converter 12 having various functions necessary for converting an analog video signal outputted from the television camera 1 to a digital video signal as well as for converting the digital video signal to image data (Although such functions cannot simply be called "analog-to-digital conversion", we call them so for simplicity of the description), frame memories 13A and 13B for temporarily storing the A/D converted video signal, a network interface 14 which performs a predetermined switching operation such as processing call origination between the transmitter 1 and the receiver 2 through the transmission path 3 using the ISDN network, and a controller 16 which systematically controls those elements as a transmitter which transmits a required video.

Frame memories 13A and 13B each has a capacity large enough to store the A/D converted video signal, for example, of one frame, temporarily and are prescribed with reference to application in the present embodiment as follows:

(1) Frame memory 13A:

This memory is used to store the video signals outputted from television camera 11 and corresponding to a particular event on a monitored object; and (2) Frame memory 13B:

This memory is used as buffer means for adjusting the timing at which the video signals outputted from television camera 11 and obtained by picking up the state of the object after the communication path is established between the transmitter and the receiver 2 are transmitted on a real time basis.

Writing/reading a video signal corresponding to the application of these memories 13A and 13B is controlled collectively by the controller 16.

The controller 16 includes, for example, a microcomputer which starts up the A/D converter 12 on the basis of a signal indicative of the detection of the particular event by the sensor 15 to convert the video signal outputted from television camera 11 to a digital signal, writes one frame of the converted video signal into the frame memory 13A for storing purposes, writes the subsequent digitally converted video signal into the frame memory 13B while making call origination to the network interface 14 to perform a process for logical connection between the transmitter 1 and the receiver 2 though the transmission path 3. Such video signal processing and subsequent video signal transmission performed mainly by the controller 16 will be described in detail later with reference to FIG. 3 or 4.

The video receiver 2 includes a network interface 21 to perform a predetermined switching operation in conjunction with the network interface 14 to establish a communication path between the receiver 2 and the transmitter 1 on the basis of a call received through the transmission path 3, a frame memory 22 which temporarily stores the (digital) video signal received from the transmitter 1 after the establishment of the communication path, a D/A converter 23 having various functions necessary for converting the digital video signal read from the frame memory 22 to an analog video signal as well as for reproducing the analog signal as images (such functions are simply called A/D in the specification) and a controller 25 which systematically controls the respective operations of those elements.

A CRT display 24 connected to the video receiver 2 reproduces as a monitored image the analog video signal outputted by the D/A converter 23. A control console 26 connected to the video receiver 2 is used by the operator to input a request for switching between the video signal (stored in the frame memory 13A), for example, existing at the occurrence of the particular event and the subsequent real-time video signal (transmitted through the frame memory 13B), etc. If such a switching request is input through the control console 26, the resulting command is transmitted to the controller 25 and hence to the controller 16 of the video transmitter 1 through the network interface 22, transmission path 3 and the network interface 14. When the controller 16 receives such request, it switches the frame memory the reading of which is controlled by the controller 16 at that time from the frame memory 13B to the memory 13A or vice versa. Also, as will be described in greater detail, call origination can be made from the receiver 2 to the transmitter 1 through the console 26.

The frame memory 22 provided in the receiver 2 has a capacity to store, for example, one frame of the image signal, like the frame memory 13A or 13B and temporarily stores the video signal received from the transmitter 1 and mainly used as buffer means for adjusting the timing at which the monitored image is reproduced on the display 24.

Figure 2:
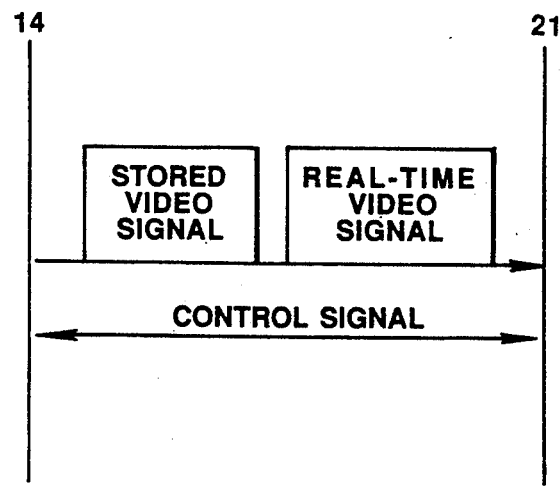
FIG. 2 schematically illustrates the structure of a transmission path shown in FIG. 1.

FIG. 2 shows on example of the communication path established as transmission path 3 of FIG. 1. As mentioned above, the communication path is established as the transmission path 3 on the basis of call origination from either one of the sending and receiving ends. In the present embodiment, as shown in FIG. 2, part of the band is allocated to a channel used for transmission and reception of various control signals and the remaining band portion is allocated to channels for transmission of the video signals, which are transmitted in a multiplexed manner on a time or frequency division basis.

If compression is required for suppressing the redundancy of the video signal transmitted through the transmission path 3 in this way, an encoding/compression unit (not shown) in the network interface 14 provided in the video transmitter 1 compresses such video signal and restores the video signal through a decoding/expansion unit (not shown) in the network interface 21 provided in the video receiver 2.

FIG. 3 shows one example of the procedures of acquisition and transmission of the monitored video performed by the system of the present embodiment, which will be described in detail below with reference to FIG. 3. Assume here that the video signals existing at and after the occurrence of a particular event such as, for example, an abnormal water level, to be monitored as in an ITV system used to monitor the water level in a dam have importance.

If now the sensor 15 (in this case, for example, a water level sensor) detects the occurrence of a particular event such as an abnormal water level, and a detection signal from sensor 15 indicative of the occurrence of such abnormal event is input to the controller 16 of the video transmitter 1 (step 301 in FIG. 3), the video transmitter 1 is started up in response to this signal. The video transmitter 1 then acquires the video signal to be monitored and transmits the acquired video signal in the manner recited below:

(1) When the controller 16 receives the detection signal, it first enables the A/D converter 12, puts the frame memory 13A in a write-enabled state, converts to a digital video signal an analog video signal corresponding to the video of the object (in this case, for example, a region where danger is expected to occur when an abnormal water level occurs in a dam) when the monitored particular event is detected, and stores the converted signal in the frame memory 13A (step 302 in FIG. 3). Writing image signals into the frame memory 13A is made until the frame memory 13A (in the present embodiment, for one frame of the video signal) is filled to capacity and then writing and reading are inhibited to maintain the stored video signals. After writing into the frame memory 13A is inhibited, the other frame memory 13B is put in write and read-enabled state and the subsequent videos of the object are temporarily stored in the frame memory 13B and then sequentially read out.

(2) Simultaneously with such control over the frame memories, the controller 16 sends an indication of call origination to the network interface 14 through which it starts to perform a call operation to establish a communication path between the transmitter and the video receiver 2 (step 303 in FIG. 3). Whether the communication path is established or not is determined by the reception, by the network interface 14, of an acknowledge signal returned by the video receiver 2 in response to the call origination (step 304 in FIG. 3).

(3) When the controller 16 determines that the communication path between the transmitter 1 and the receiver 2 is established through such call operation, it delivers the video signals, sequentially written into and fetches from the frame memory 13B, as indicating the so-called real time videos of the object, to the network interface 14 and transmits these signals to the video receiver 2 through the established communication path (step 305 in FIG. 3). The video receiver 2 fetches the thus transmitted video signals through the network interface 21, sequentially writes the fetched video signals through control provided by the controller 25 into the frame memory 22, while reading these signals sequentially from the memory 22 and converting (demodulating) these read digital video signals through the D/A converter 23 to analog video signals. The video receiver 2 further inputs the demodulated analog video signals to the CRT display 24 to reproduce the transmitted video signals. If the operator makes a request for transfer of the videos stored at the occurrence of the particular event, or a request or instruction to terminate the monitoring operation, etc., through the control console 26 at the video receiver 2, the video receiver 2 reports such request or instruction through the controller 25 to the controller 26 of the video transmitter 1;

(4) When the controller 16 (video transmitter 1) receives a request for transfer of the stored video (step 306 in FIG. 3), it, for example, switches the addressing to switch the frame memory from which the video signal is to be read from the memory 13B to the memory 13A, reads the video (image) signal stored in the frame memory 13A while sending the video signal to the video receiver 2 through the network interface 14 (step 307 in FIG. 3);

(5) After the controller 16 (video transmitter 1) has transmitted the video stored in the frame memory 13A in response to the transfer request, it again switches the frame memory from which the video signal is to be read from the frame memory 13A to the frame memory 13B and transmits the above mentioned so-called real-time video of the object to the video receiver 2 (step 309 in FIG. 3), and, if the controller 16 receives an instruction for terminating the monitoring operation (step 308 in FIG. 3), the controller 16 causes the network interface 14 to switch off the line and returns the A/D converter 12 and frame memories 13A and 13B to their inactive states, namely, temporarily terminates its processing and waits for the next reception of the detection signal from the sensor 15.

As just described above, according to acquisition and transmission of the video signal of the object by the system of this embodiment, the video of the object existing after the occurrence of a particular event such as an abnormal water level to be monitored can be monitored efficiently. The video signal existing at the occurrence of the particular event to be monitored can be reliably captured and stored and the stored video can be reproduced for monitoring purposes at any point in time which the operator desires.

As mentioned above, FIG. 3 shows the procedures of acquisition and procedures of transmission of the videos to be monitored in the video monitoring system applied to an ITV system where the videos of the object existing at and after the occurrence of the particular event to be monitored have significance. Another example in which the video to be monitored is acquired and transmitted in the video monitoring system of the embodiment applied to the security system will be described with reference to FIG. 4. As mentioned above, in the security system, a video existing at the occurrence of a particular event (in this case, "there is an invader") such as the video of the coverage to be monitored by the television camera 11 when somebody unlawfully invades the coverage is most important.

If the sensor 15 (in this case, for example, a door sensor) senses the occurrence of a particular event (the presence of an invader, etc.) and the resulting detection signal is input to the controller 16 of the video transmitter 1 (step 401 in FIG. 4), the video transmitter 1 is started up on the basis of the detection signal as in the previous embodiment. The started video transmitter 1 acquires and transmits the video to be monitored through the controller 16 in the steps recited below:

(1) Receiving the detection signal, the controller 16 first enables the A/D converter 12, puts the frame memory 13A in a write-enabled state, converts to a digital video signal the analog video signal corresponding to the video of the object (in this case, for example, the inside of a room to be monitored, for example) at the time when a particular event to be monitored has been detected, and stores the converted signal in the frame memory 13A (step 402 in FIG. 4). Writing the video signals into the frame memory 13A is performed until the frame memory 13A is filled to capacity, writing and reading are then inhibited for maintaining the stored video signals, as mentioned above. After writing into the frame memory 13A is inhibited, the other frame memory 13B may be put in write- and read-enabled state. Alternatively, especially in this case, the other frame memory 13B may be put in a write-disabled state at this time;

(2) The controller 16 give to the network interface 14 an indication to make call origination simultaneously with the control of the frame memories, and starts call origination to establish a communication path between the transmitter 1 and the receiver 2 through the network interface 14 (step 403 in FIG. 4). Whether the communication path has been established or not is determined by the reception, by the network interface 14, of an acknowledge signal returned by the video receiver 2 in response to the call origination (step 404 in FIG. 4);

(3) When the controller 16 determines that the communication path has been established between the transmitter 1 and the receiver 2 through such call origination, it puts the frame memory 13A in a read-enabled state and transmits the video signal stored in the memory 13A to the video receiver 2 through the network interface 14 and the established communication path (step 405 in FIG. 4). The video receiver 2 fetches the thus transmitted video signal through the network interface 21, sequentially writes the fetched video signals into the frame memory 22 through the controller 25, sequentially reads those signals from the memory 22 and converts (demodulates) the thus read digital video signals through the D/A converter 23 to analog video signals. The video receiver 2 further inputs the thus obtained analog video signals to the CRT display 24 to reproduce the transmitted videos. This causes the video of the object at the time of occurrence of the particular event to be outputted through the display 24 for monitoring purposes. When the operator makes a request for transmission of the subsequent real-time video of the object or a request or instruction for termination of the monitoring operation through the console 26 at the video receiver 2, the video receiver 2 reports this fact to the video transmitter 1 through its controller 25;

(4) When the controller 16 (video transmitter 1) receives a request for transmission of the real time video (step 407 in FIG. 4), it switches the frame memory, to be controlled, from the memory 13A to the memory 13B to put the frame memory 13B thereafter in a read-write enabled state, delivers into the network interface 14 the video signals, sequentially written into and sequentially read out from the memory 13B, as showing the so-called real time video of the object and transmits the video signal to the video receiver 2 through the communication path (step 408 in FIG. 4); and (5) When the controller 16 (video transmitter 1) receives an instruction to terminate the monitoring operation in the meantime (step 406 in FIG. 4), it causes the network interface 14 to cut off the line, returns the A/D converter 12 and frame memories 13A and 13B to their inactive states, namely, temporarily terminates the processing and waits for the next arrival of the detection signal from the sensor 15.

As mentioned above, according to the process for acquiring and transmitting the video in the manner shown in FIG. 4, the video of the object existing at the occurrence of the particular event and regarded as the most important is surely captured and stored. After the establishment of the communication path, such video can immediately be monitored, so that a very high reliability system is constructed as the security system.

While the control procedures shown in FIGS. 3 and 4 are beforehand written and registered as a control procedure program for the controller 16 of the video transmitter 1 in a program memory (not shown), it is optional which of the controlling procedures of FIGS. 3 and 4 is to be selected in the system of the FIG. 1 embodiment. Namely, a convenient control procedure may be selected in accordance with the property of an applied system such as an ITV system or a security system.

The videos are registered in any form into the system of the embodiment. Only one of the control procedures shown in FIGS. 3 and 4 may be registered in the program memory to support that control procedure. Alternatively, both the control procedures may be registered in the program memory to support them and one of those control procedures may be selected and carried out by setting a dip switch (not shown) or the like.

While in the above embodiment each frame memory 13A, 13B, 22 has been illustrated having a storage capacity for a one-frame video signal, selection of such memory capacity is optional. Especially, the frame memory 13a which stores the videos of the object existing at the occurrence of the particular event is required to be a memory having a capacity enough to store a one-field image signal corresponding to at least one of the odd and even fields, which permits the stored video to be monitored with a minimum resolution.

Conversely, the use of a memory having a capacity large enough to store a plurality of frame image signals permits the acquisition of video signals for a plurality of pictures for several seconds-several minutes. Especially, if the controller 16 puts the memory 13A in a write-enabled state and stores the video signals corresponding in amount to the storage capacity of the memory 13A when the sensor 15 senses the occurrence of the particular event, the time dissipated for the establishment of the communication path is complemented by a time duration corresponding to the storage capacity of the memory 13A (accurately, the time duration additionally includes the pickup speed of the pickup means and the speed at which the video signal is written into the memory 13A) to thereby maintain the important video for the time duration.

The process for storing the video signal in the frame memory 13A using the controller 16 is not limited to the above-mentioned process and any such process may be employed. Alternatively, for example, the frame memory 13A may be put in a state where the video signal outputted from the television camera 11 can be written at all times and, when the sensor 15 senses the occurrence of the particular event, the memory 13A may be put in write-disabled state so as to maintain the video signal at that time.

The sensor 15 is not limited to the above mentioned water level sensor, temperature sensor, motion detector, door sensor, infrared sensor, etc., and a timer which detects the "arrival of a preset monitor time or moment" as the "occurrence of the particular event to be monitored" may be used when required. In this respect, if such timer is used as the sensor 15, the video transmitter 1 is started up each time the timer detects the "arrival of the preset monitor time or moment" to thereby store (update) in the frame memory 13 the video of the object at that time A, establishes a communication path between the video transmitter 1 and the video receiver 2 and transmits the stored video automatically to the video receiver 2 in accordance with a request for transfer from the video receiver 2 or in conjunction with the establishment of the communication path.

Figure 5:
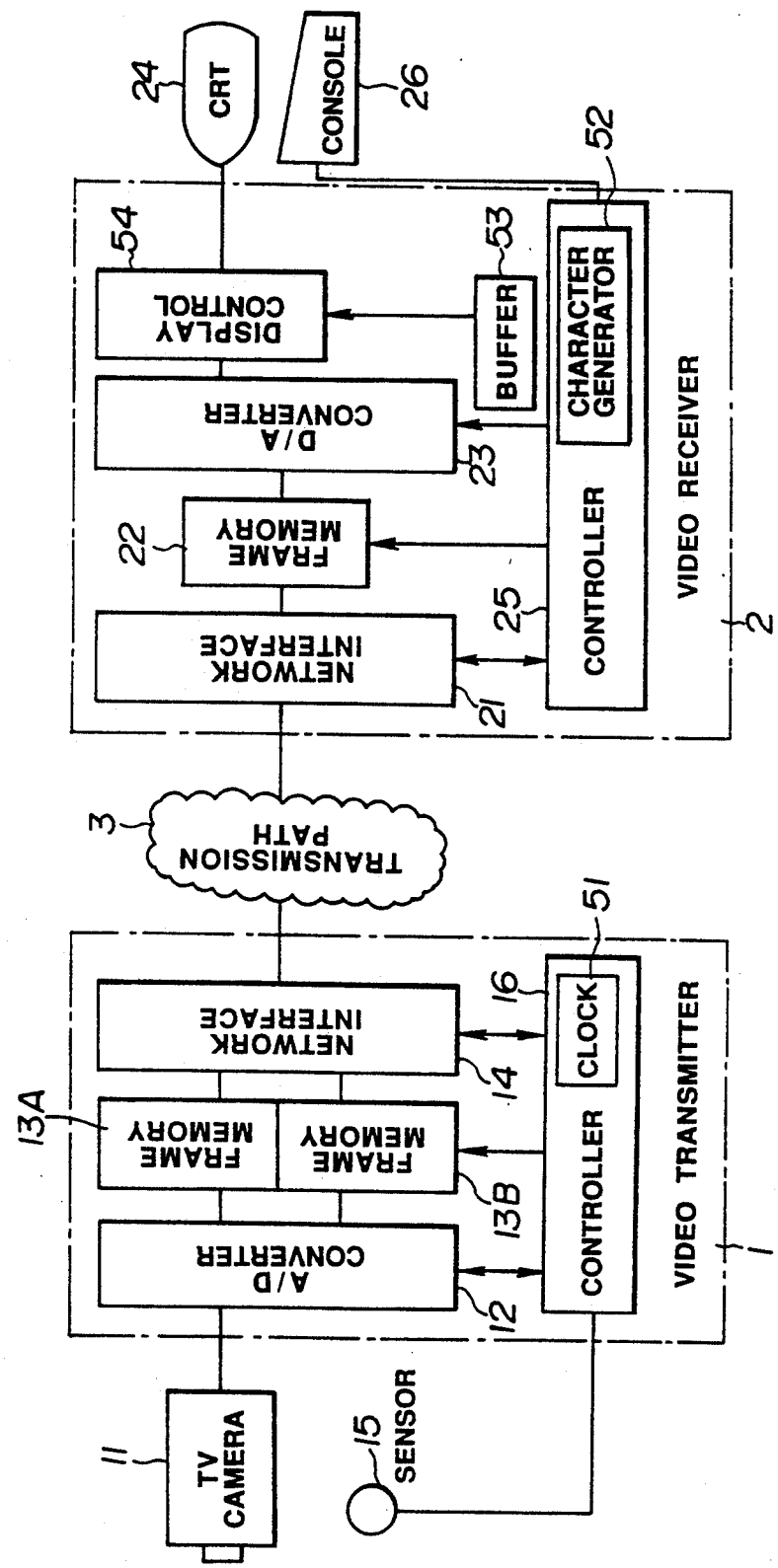
FIG. 5 is a block diagram of the system structure of a second embodiment of a video monitoring system according to the present invention.

FIG. 5 shows a second embodiment of the video monitoring system according to the present invention. In FIG. 5, the same element as that shown in FIG. 1 is given the same reference numeral as that used in FIG. 1 for identifying purposes and a duplicated description of that element will be omitted.

In the system of this particular embodiment, as shown in FIG. 5, a clock 51 is provided in the video transmitter 1 while a character generator 52, a buffer memory 53 and a display control unit 54 are provided in the video receiver 2.

As mentioned above, in this system, the time when the sensor 15 outputs to the controller 16 a detection signal indicative of the occurrence of a particular event is obtained from the clock 51. After the establishment of a communication path between the video transmitter and the video receiver 2, the resulting data on that time is transmitted to the video receiver 2 together with the video signal stored in the frame memory 13A. The video receiver 2 delivers the received time data to the character generator 52 to create character data corresponding to the time data, temporarily stores the character data in the buffer memory 53, transmits the stored video data to the frame memory 13A, reads this data from the frame memory 22, and converts the digital data through the D/A converter 23 to an analog video signal. At this time, the video receiver 2 superimposes the created and stored character data (time indication data) in a predetermined portion of the monitor screen so as to be synchronized with the monitor screen of the video through the display control unit 54.

Thus, when, the video of the object at the occurrence of a particular event such as an abnormality is displayed on the CRT display 24 together with the time when the particular event occurred, so that it is clear when the monitored event occurred.

Transfer of the time data may be made directly after the establishment of the communication path (see FIG. 2) or when a request for transfer of the video stored in the memory 13A is made.

If the control console 26 at the video receiver 2 includes a display to display various control data entities, the time data may be displayed on the display.

Figure 6:
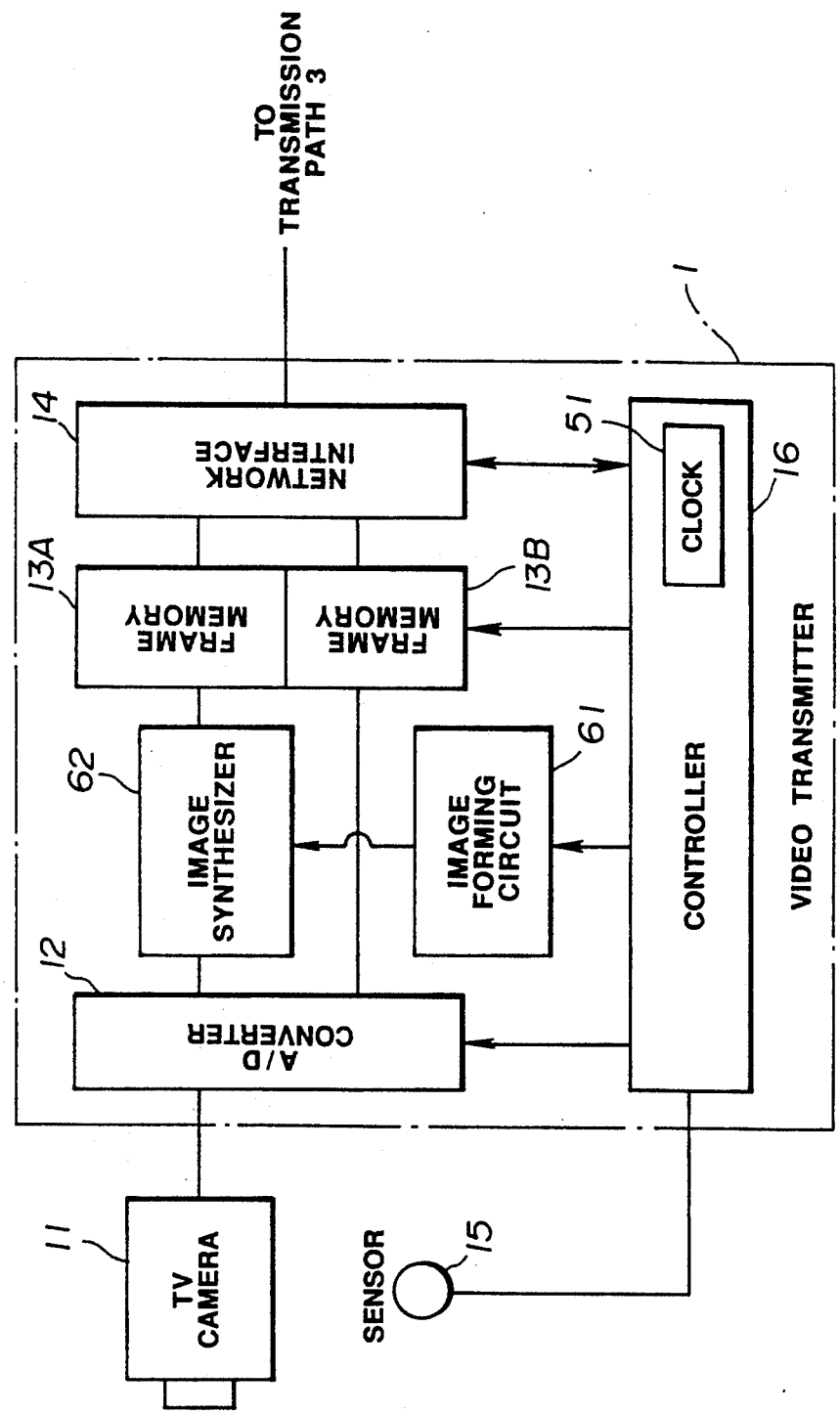
FIG. 6 is a block diagram of a modification of the system structure of the second embodiment shown in FIG. 5.

While such time data is preferably transmitted through a transmission/reception channel for various control signals or through a control signal path in the communication path illustrated in FIG. 2, the time data (converted already to an image when the video is stored in the frame memory 13A) and the video corresponding thereto and stored in the frame memory 13A can be transmitted as an unit through the video signal transmission channel if the video transmitter 1 has a structure, for example, shown in FIG. 6.

In the video transmitter 1 of FIG. 6, an image forming circuit 61 forms a character image, for example, as a bit map image in correspondence to the time data from the clock 51. An image synthesizing circuit 62 synthesizes the character image produced by the image forming circuit 61 and the digital signal to which the video signal is converted by the A/D converter 12 and writes the synthetic image in the frame memory 13A. Therefore, as mentioned above, the time data from the clock 51 is written, as a part of the video to be stored, in the frame memory 13A. When the stored video is read from the frame memory 13A and transmitted, the time data is transmitted as a part of the video to the video receiver 2 through the video signal transmission channel.

When the video transmitter 1 employs the structure of FIG. 6, the second embodiment produces advantages similar to those mentioned above even if the video receiver 2 has the structure of FIG. 1, of course.

Figure 7:
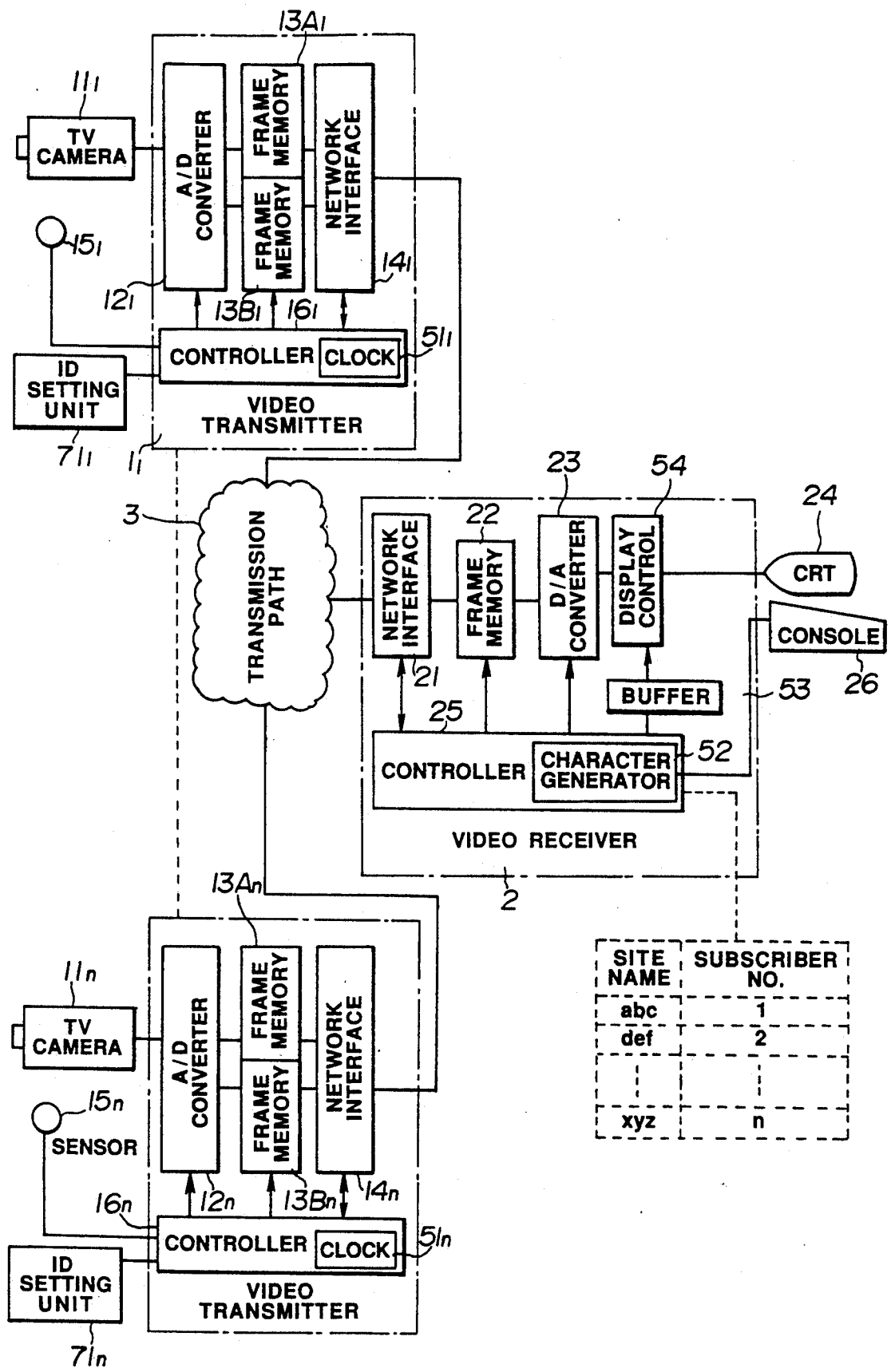
FIG. 7 is a block diagram of the system structure of a third embodiment of the video monitoring system according to the present invention.

FIG. 7 shows a third embodiment of the video monitoring system according to the present invention. As shown in FIG. 7 the system of this embodiment includes a plurality of video transmitters as video sending stations and is intended to monitor the videos obtained by those stations using a single receiver. Assume here that as an example the respective transmitters and the receiver basically have the structures shown in FIG. 5. Also, in FIG. 7, the same element as that shown in FIG. 1 or 5 is given the same reference numeral as, or a reference numeral corresponding to, that used in FIG. 1 or 5 and a duplicate description of that element will be omitted.

In the system of this embodiment, the respective video transmitters 11-1n include ID setting units 711-71n in which the corresponding names of sites and other identification data entities are beforehand set. When respective controllers 161-16n transmit video signals and time data entities acquired by the corresponding stations to the video receiver 2, they also transmit the respective site names and other identification data entities set in the ID setting units such that the receiver 2 can properly determine which video transmitters have transmitted those video signals and time data entities.

The video receiver 2 performs processing operations on the identification data entities such as site names thus transmitted through character generator 52, the buffer memory 53 and the display control circuit 54 and similar to the processing operation performed on the above mentioned time data and displays the result on the CRT display 24.

By employing such structure, the videos acquired by the respective sending stations can be properly monitored by the single receiving station even if the N sending stations and the single receiving station are disposed where N is an integer equal to, or larger than, 2.

According to such structure, under a situation where the number of communication paths which can be constituted simultaneously is one, and even if the plurality of sending stations simultaneously or sequentially detect the occurrences of particular events such as abnormalities, desired data on "at which sites" and "when" these events occurred can be properly viewed through the CRT display 24 when the sole video receiver 2 sequentially responds to the different sending stations. The fact that the videos of the object existing at the occurrence of particular events such as abnormalities are reliably stored in the respective sending stations even if more or less time is taken for the establishment of the communication path applies also in this embodiment.

Figure 8:
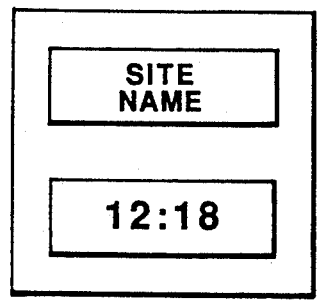
FIG. 8 schematically illustrates an indicator disposed on a control console of the third embodiment of FIG. 6.

If this embodiment also has a display on which the control console 26 of the video receiver 2 displays various control data entities, the system becomes easy to handle by causing the display to display the sending station identification data such as site name and the time data, for example, in the manner shown in FIG. 8.

Even if the system has the structure in which the N sending stations and the single receiving station are disposed as illustrated in FIG. 7, the respective video transmitters may be constructed in an arrangement similar to that of FIG. 6. In this case, sending station identification data entities such as the site names and time data entities and the videos to be stored are stored as units in the respective frame memories 13A1-13An.

It is especially advantageous to set the logical structure of the transmission path 3 in the system of FIG. 7 as follows. While the transmission path 3 constructed by using an ISDN network has a path arrangement shown basically in FIG. 2, as mentioned above, only (N) control signal paths for sending stations to be monitored or the subscribers of the system should here especially be established simultaneously depending on packet multiplexing, etc.

A site name-subscriber number table such as, for example, that shown by the broken lines in FIG. 7 is prepared in appropriate memory means in the video receiver 2. The controller 25 refers to the site name-subscriber number table and controls the network interface 21 such that a video signal transmission path is established between the transmitter corresponding to the appropriate subscriber number and the receiver on the basis of the appropriate indication of call origination and the site name by the operator through the control console 26 (a list of the displays and site names illustrated in FIG. 8 is displayed on a display provided, for example, on the control console 26, and a user interface is provided in which the data on any site name selected by the operator is delivered to the controller 25).

By employing such structure, the receiving station end can one-sidely select a desired one of the plurality of video transmitters to be monitored when required. According to such arrangement, when, for example, the occurrence of a particular event such as an abnormality is detected in a site (video transmitter) when the video of another site (video transmitter) is monitored through the CRT display 24 at present, the name of the site (identification data) and time data involving the new detection of the event are transmitted to the receiver 2 through the simultaneously established control signal path and displayed on the display of the control console 26. Since the video signal transmission path is not switched at this time to another one, the video monitored through the CRT display 24 remains as the original site video. Until the operator indicates call origination and designates the site name in the above manner in accordance with the displayed site name and time data, the video signal transmission path is not switchingly established between the receiver and the designated site (video transmitter) to permit monitoring the video acquired and stored in the appropriate site. By switching establishment of the video signal transmission path in this way, display of the name of the appropriate site and the time data concerned on the display of the control console 26 should be reset.

In this embodiment, it is assumed that a plurality of the control signal paths whose number equal to the number of subscribers are established simultaneously. In practice, however, the number of paths on video receiving station side may be smaller than the number of the transmitting stations. In other words, a path or paths may be established whenever necessary, and released them upon completion of data "absorption". When the number of paths possibly to be established simultaneously are prepared, it is not necessary to constantly establish the paths for every transmitting stations. In case that a larger number of the paths are required, the abovedescribed path establishing process are repeatedly carried out on the video transmitting station side at an interval determined by, for example, a timer.

Figure 9A:
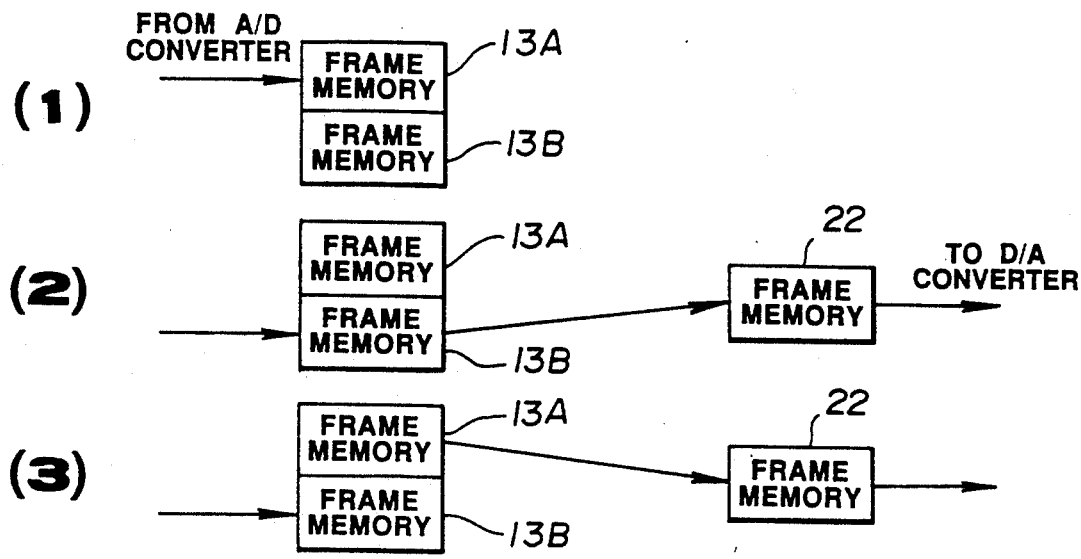
FIGS. 9A–9E are block diagrams which schematically illustrate variations of use of a frame memory which can be arranged in the respective systems of the above embodiments.

As schematically illustrated, for example, in FIG. 9(A) in the above respective embodiments, (A) It is assumed that delivery and reception of the video signals is made between the two frame memories 13A and 13B provided in the video transmitter and the single frame memory 22 provided in the video receiver as follows:

(1) The video to be maintained is stored in the memory 13A. When the memory 13A is filled with the videos to capacity, the memory 13B is selected where new videos are to be written;

(2) After the establishment of the communication path, the real time video written into the memory 13B is transferred to the memory 22 for monitoring purposes; and (3) The video stored in the memory 13A is transferred to the memory 22 for monitoring purposes (as shown in FIG. 4, the items (2) and (3) can be reversed).

(B) Alternatively, for example, as schematically illustrated in FIG. 9, (B) in a similar manner, the delivery and reception of video signals may be made between two frame memories 22A, 22B provided also in the video receiver end and the frame memories 13A, 13B in the transmitter ends as follows:

(1) Videos to be maintained are stored in the memory 13A. When the memory 13A is filled with the videos to capacity, the memory 13B is selected as a new memory in which the videos are to be written;

(2) After the establishment of the communication path, the real time video written into the memory 13B is transferred to the memory 22B for monitoring purposes;

(3) After the establishment of the communication path, the videos stored in the memory 13A are copied into the memory 22A at appropriate timing for transferring and storing purposes;

(4) The frame memory from which the videos are to be read is switched from the memory 22B to the memory 22A for monitoring the videos transferred and stored in the memory 22A; and (5) If necessary, the real time images written again into the memory 13B are transferred to the memory 22B for monitoring purposes.

Figure 9B:
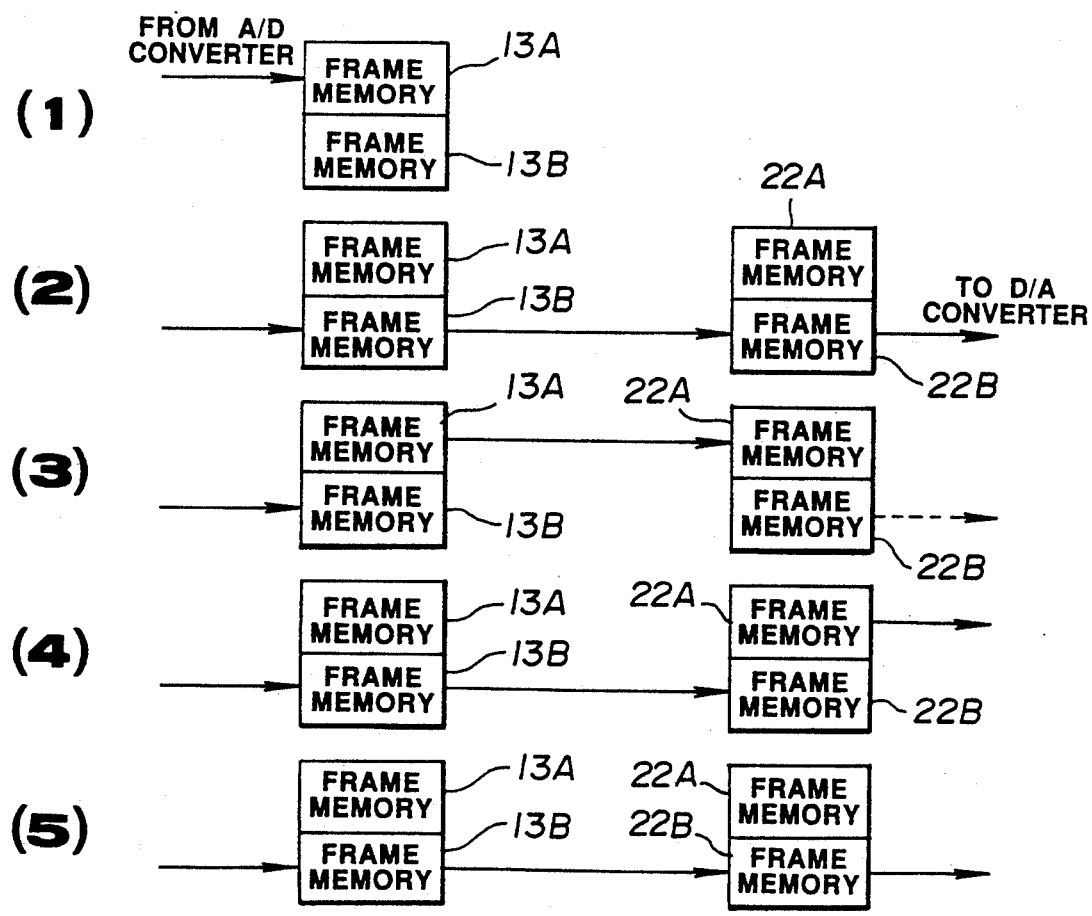

Especially, according to the memory arrangement and the video signal transmission and reception shown in FIG. 9(B), instantaneous switching between the stored images and the images transmitted on a real time basis is achieved in the receiver end.

Figure 9C:
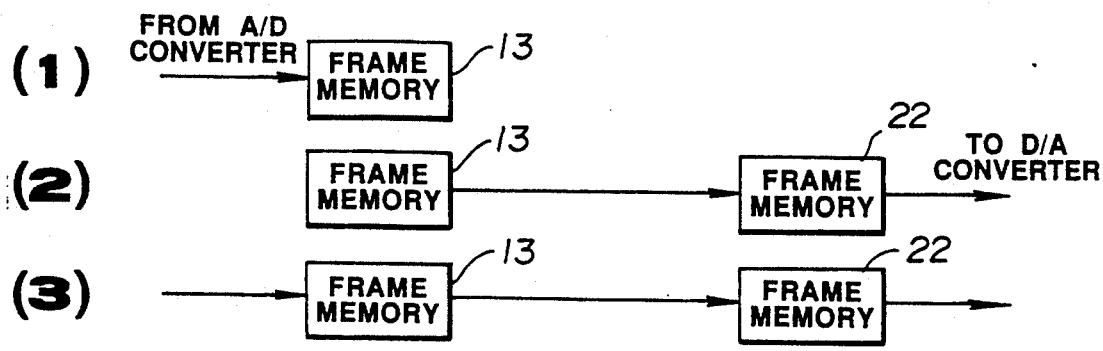

The transmission and reception of video signals is also possible in the manner schematically illustrated in FIG. 9(C), namely:

(C) Only two memories 13 and 22 are provided in the video transmitter and the receiver ends, respectively, to transmit and receive video signals as follows;

(1) Videos to be maintained are stored in the memory 13. When the memory 13 is filled with the videos to capacity, writing the videos is inhibited;

(2) When a communication path is established, the stored videos are transferred to the memory 22 for monitoring purposes; and (3) If necessary, the memory 13 is again put in a write-enabled state and the real time videos written into the memory 13 are transferred to the memory 22 for monitoring purposes.

Thus, the respective systems of the embodiments are realized by using the minimum memory arrangement.

Figure 9D:
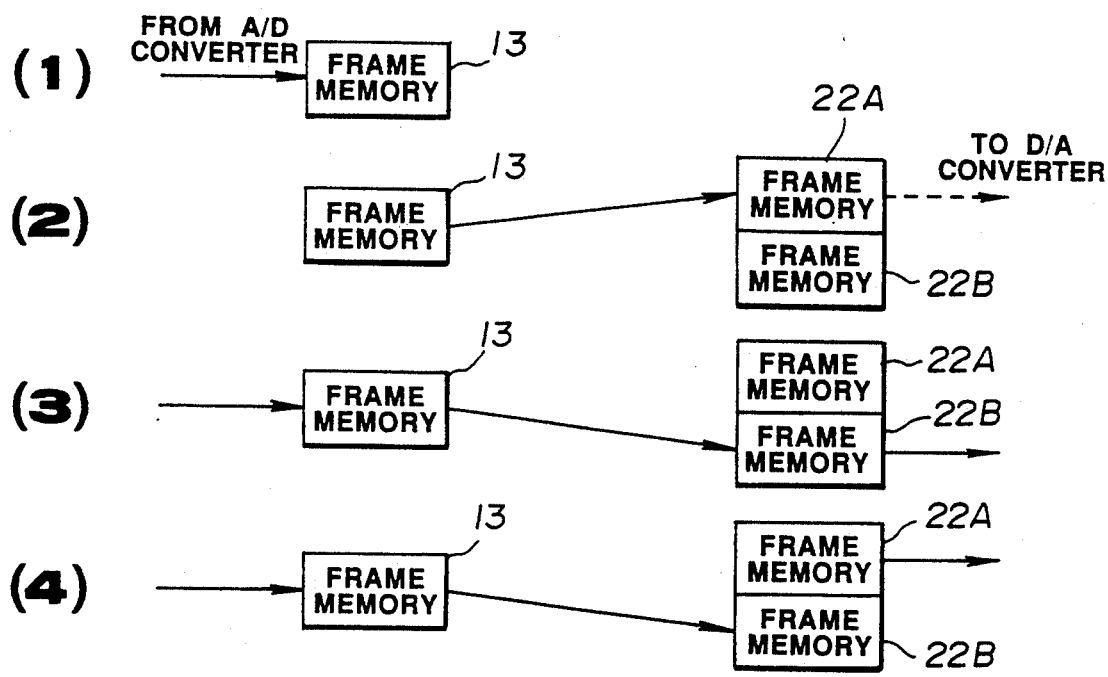

(D) The transmitter and receiver ends may be reversed with reference to the number of frame memories disposed, as shown in FIG. 9(D).

(D) Namely, only one memory 13 may be provided as the frame memory in the video transmitter end while two frame memories 22A and 22B may be provided in the video receiver end such that delivery and reception of video signals are made between the memory 13 and memories 22A, 22B as follows:

(1) The videos to be maintained are stored in the memory 13. When the memory 13 is filled with video signals to capacity, writing the videos is inhibited;

(2) When a communication path is established, the videos stored in the memory 13 are copied into, namely, transferred and stored in, the memory 22A;

(3) If necessary, the memory 13 is again put in a write-enabled state and the real time image written in the memory 13 is transferred to the memory 22B for monitoring purposes; and (4) The frame memory from which the video is to be read out is switched from the memory 22B to the memory 22A for monitoring the videos transferred and stored in the memory 22A.

According to this arrangement, the advantage produced by the process (B); namely, "instantaneous switching between the stored video and the video transmitted on a real time basis is achieved in the receiver end" is achieved using a reduced-sized memory structure.

Figure 10:
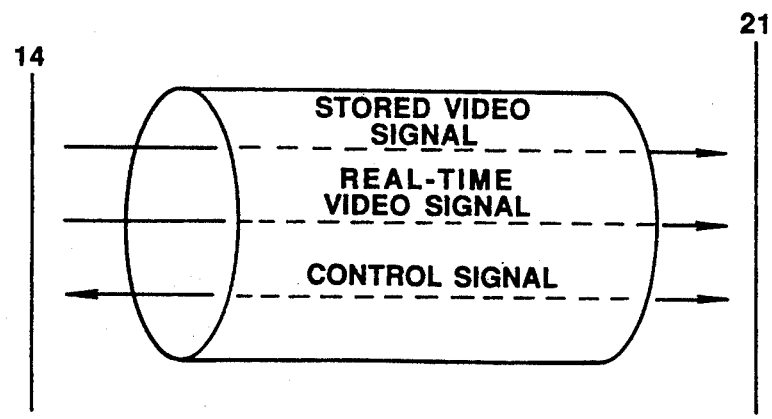
FIG. 10 schematically illustrates the structure of a bus in each of the above systems and presupposed especially when the frame memory is used in the form of FIG. 9(E).
Figure 9E:
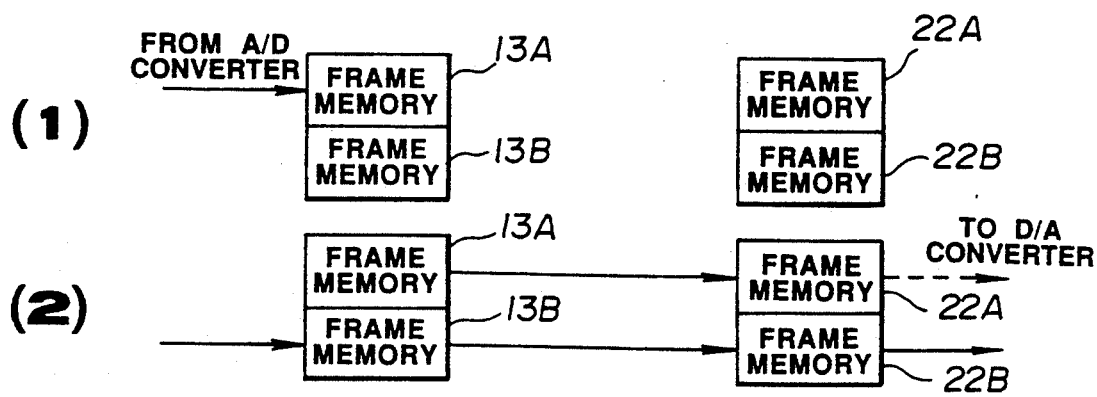

If transmission path 3 can have the structure, for example, shown in FIG. 10, namely, two video signal transmission paths for the stored videos and real time videos can be established simultaneously in addition to the control signal path, transmission and reception of video signals is achieved in the manner illustrated schematically in FIG. 9(E).

(E) Namely, as shown in FIG. 9(E), two pairs of frame memories 13A, 13B and 22A, 22B are provided in the corresponding transmitter and receiver ends, respectively, to transmit and receive video signals as follows:

(1) Video signals to be maintained are stored in the memory 13A. When the memory 13A is filled with video signals to capacity, the memory 13B is selected as a memory into which the video signals are newly to be written;

(2) When the communication path (see FIG. 10) is established, the videos stored in memory 13A are copied, namely, transferred and stored, into the memory 22A. The real time videos written into the memory 13B are transferred to memory 22B for monitoring purposes; and (3) At any point in time, the frame memory from which the videos are to be read is switched from the memory 22B to the memory 22A for monitoring the videos transferred to and stored in the memory 22A.

In this case, as long as the communication path is established, a desired video can freely monitored when required in the receiver end.

As described above, the structures of the frame memories in the transmitter and receiver ends and how to use them may be changed variously.

If a memory (in the above embodiment, memory 22A) for storing videos is also provided as a second frame memory in the receiver end, the videos existing when the sensor 15 senses the occurrence of a particular event can securely captured through selection of a memory from which the videos are newly to be read, etc.

If it is predicted that the sensor 15 very often senses the occurrence of such an event during transmission of videos, additional memories for storing the videos are required to be provided in either the transmitter end or the receiver end such that they can be used in a switching manner.

As mentioned above, the illustrated frame memory 13B or 22B is usually used as buffer means for adjusting the timing of image transmission exclusively. If synchronization is properly maintained for video transmission between the video transmitters and the video receiver, these additional frame memories must not necessarily provided.

What is claimed is:

1. A video monitoring system comprising:
   a sending station for outputting a video signal indicative of an image of an object;
   a receiving station including monitor means for reproducing an image from the video signal; and
   a communication path established between the sending station and the receiving station only when monitoring is required through the monitor means,
   wherein said sending station comprises:
   pickup means for at all times picking up the image of the object and outputting the video signal indicative of the image;
   memory means for storing a video signal on the object corresponding to a particular event to be monitored, said memory means including a frame memory having a capacity to store an image signal of at least one field;
   sensor means for detecting the occurrence of the particular event to be monitored; and
   control means for storing in said memory means the video signal outputted from the pickup means in accordance with the detection of the occurrence of the particular event by said sensor means and for reading the video signal stored in said memory means to transmit the video signal to said receiving station after a communication path is established between said sending station and said receiving station,
   wherein said control means puts said memory means in a write-enabled state in which the video signal outputted from said pickup means can be written at all times and, when said sensor means detects the occurrence of the particular event, said control means puts said memory means in a write-disabled state to maintain the video signal already stored in said memory means.

2. A video monitoring system according to claim 1, wherein said communication path includes a control signal path for transmitting a control signal to establish a logical connection between said sending and receiving stations and a video signal from said sending station to said receiving station when said sending and receiving stations are logically connected,
   the video signal outputted from said pickup means and the video signal stored in said memory means being transmitted to said receiving station through said video signal path on a time division manner after the establishment of the communication path.

3. A video monitoring system according to claim 2, wherein the video signal stored in said memory means is transmitted to said receiving station through said video signal path only when said receiving station makes a request for transfer of the video signal through said control signal path.

4. A video monitoring system according to claim 2, wherein the video signal stored in said memory means is transmitted to said receiving station through said video signal path unconditionally before the video signal is outputted from said pickup means and after the communication path is established between said sending and receiving stations.

5. A video monitoring system according to claim 2, wherein said receiving station includes a copying memory for copying and storing the video signal read out from said memory means and received through said video signal path, and supplies the video signal copied and stored in said copying memory to said monitoring means at any required point of time.

6. A video monitoring system according to claim 1, wherein said communication path includes a control signal path for transmitting a control signal to establish a logical connection between said sending and receiving stations and a video signal from said sending station to said receiving station when said sending and receiving stations are logically connected,
   the video signal outputted from said pickup means and the video signal stored in said memory means being transmitted to said receiving station through said video signal path on a frequency division manner after the establishment of the communication path.

7. A video monitoring system according to claim 6, wherein the video signal stored in said memory means is transmitted to said receiving station through said video signal path only when said receiving station makes a request for transfer of the video signal through said control signal path.

8. A video monitoring system according to claim 6, wherein the video signal stored in said memory means is transmitted to said receiving station through said video signal path unconditionally before the video signal is outputted from said pickup means and after the communication path is established between said sending and receiving stations.

9. A video monitoring system according to claim 6, wherein said receiving station includes a copying memory for copying and storing the video signal read out from said memory means and received through said video signal path, and supplies the video signal copied and stored in said copying memory to said monitoring means at any required point of time.

10. A video monitoring system according to claim 1, wherein said communication path comprises a control signal path for transmitting a control signal to establish a logical connection between said sending and receiving stations, and a first and second video signal paths for transmitting the video signal from said sending station to said receiving station when said sending and receiving stations are logically connected to each other;
    the video signal outputted from said pickup means after the establishment of said communication path being transmitted to said receiving station through said first video signal path, and the video signal stored in said memory means being transmitted to said receiving station through said second video signal path.

11. A video monitoring system according to claim 10, wherein said receiving station includes a copying memory for copying and storing the video signal read out from said memory means and received through said second video signal path, and supplies the video signal copied and stored in said copying memory to said monitoring means at any required point of time.

12. A video monitoring system comprising:
    a plurality of sending stations each for outputting a video signal indicative of an image of an object;
    a receiving station including monitor means for reproducing an image from the video signal; and a communication path selectively established between the plurality of sending stations and the receiving station to thereby monitor the video signal from a particular sending station through the monitor means when monitoring is required, wherein each of said sending stations comprises:

pickup means for at all times picking up the image of the object and outputting the video signal indicative of the image;

memory means for storing a video signal on the object corresponding to a particular event to be monitored, said memory means including a frame memory having a capacity to store an image signal of at least one field;

sensor means for detecting the occurrence of the particular event to be monitored;

first control means for storing in said memory means the video signal outputted from the pickup means in accordance with the detection of the occurrence of the particular event by said sensor means; and second control means for transmitting to the receiving station data on the identification of the sending stations selectively connected to the receiving station together with data on detection of the occurrence of the particular event by said sensor means, whereby after a communication path is established between a sending station and said receiving station, the stored video signal is read from said memory means and transmitted to said receiving station, and wherein said first control means puts said memory means in a write-enabled state in which the video signal outputted from said pickup means can be written at all times and, when said sensor means detects the occurrence of the particular event, said first control means puts said memory means in a write-disabled state to maintain the video signal already stored in said memory means.

13. A video monitoring system according to claim 12, wherein said communication path comprises a plurality of control signal paths simultaneously established between the corresponding sending stations and the single receiving station for transmitting control signals therethrough and a video signal path selectively established when required for transmitting a video signal from said respective sending stations to said receiving station where said respective sending stations and said receiving station are logically connected to each other; and said second control means in each of said sending stations transmits data on the detection of the particular event and data on identification of that sending station through said the corresponding control signal path to said receiving station; and said receiving station further comprises:

display means for visually displaying data on the identification of a sending station corresponding to the transmitted data on the detection of the particular event on the basis of the transmitted data;

sending station selecting means for instructing the establishment of the video signal path between said receiving. station and any particular sending station; and third control means for establishing the video signal path through said control signal path between said receiving station and said particular sending station, and fetching through the established video signal path the video signal outputted from said pickup means of said particular sending station and the video signal stored in said memory means by making a request for transmission of the video signals.

14. A video monitoring system according to claim 13, wherein said receiving station includes a copying memory for copying and storing the video signal read out from said memory means and fetched through said video signal path and said third control means inputs the video signal copied and stored in said copying memory to said monitoring means at any required point of time.

15. A video monitoring system according to claim 12, wherein said communication path comprises a plurality of control signal paths simultaneously established between the corresponding sending stations and the single receiving station for transmitting control signals therethrough and a first and a second video signal path selectively established when required for transmitting a video signal from said respective sending stations to said receiving station where said respective sending stations and said receiving station are logically connected to each other; and said second control means in each of said sending stations transmits data on the detection of the particular event and data on identification of that sending station through said the corresponding control signal path to said receiving station; and said receiving station further comprises:

display means for visually displaying data on the identification of a sending station corresponding to the transmitted data on the detection of the particular event on the basis of the transmitted data;

sending station selecting means for instructing the establishment of the video signal path between said receiving station and any particular sending station; and third control means for establishing the video signal path through said control signal path between said receiving station and said particular sending station, fetching through the first video signal path the video signal outputted from said pickup means of said particular sending station, and fetching through the second video signal path said the video signal stored in said memory means by making a request for transmission of the video signals.

16. A video monitoring system according to claim 15, wherein said receiving station includes a copying memory for copying and storing the video signal read out from said memory means and fetched through said video signal path and said third control means inputs the video signal copied and stored in said copying memory to said monitoring means at any required point of time.

* * * * *